United States Patent
Correa-Castillo et al.

(10) Patent No.: US 7,299,930 B2
(45) Date of Patent: Nov. 27, 2007

(54) COLLECTING AGENT COMPRISING AMMONIATED COMPOUNDS (PRIMARY, SECONDARY, TERTIARY AMINES), FOR USE IN THE PROCESS OF GRINDING AND/OR FLOATING COPPER, MOLYBDENUM, ZINC, AND OTHER CONTAINED MINERAL ORES

(75) Inventors: Hector Correa-Castillo, Santiago (CL); German Rodriguez-Buendia, Santiago (CL)

(73) Assignee: Procesos Mineros e Industries Conosur S.A., Santiago (CL)

( * ) Notice: Subject to any disclaimer, the term of this patent is extended or adjusted under 35 U.S.C. 154(b) by 0 days.

(21) Appl. No.: 10/999,754

(22) Filed: Nov. 29, 2004

(65) Prior Publication Data
US 2006/0032800 A1   Feb. 16, 2006

(51) Int. Cl.
*B03D 1/01* (2006.01)
*B03D 1/008* (2006.01)

(52) U.S. Cl. .................. 209/166; 209/167; 252/61; 540/484

(58) Field of Classification Search ............. 209/166, 209/167; 252/61; 540/484, 612
See application file for complete search history.

(56) References Cited

U.S. PATENT DOCUMENTS

| | | | | |
|---|---|---|---|---|
| 1,897,265 A * | 2/1933 | Martin | ........................ | 209/166 |
| 1,974,885 A * | 9/1934 | Wigton | ........................ | 209/166 |
| 2,208,935 A * | 7/1940 | Sturgis et al. | ............. | 540/608 |
| 2,232,059 A * | 2/1941 | Farlow | ........................ | 203/76 |
| 2,611,485 A * | 9/1952 | Tveter | ........................ | 209/166 |
| 3,595,390 A * | 7/1971 | Booth | ........................ | 209/166 |
| 3,908,010 A * | 9/1975 | Schmutz et al. | ........ | 514/211.13 |
| 4,110,323 A * | 8/1978 | Dewaele | ..................... | 540/532 |
| 4,684,459 A * | 8/1987 | Klimpel et al. | ............. | 209/166 |
| 4,908,125 A * | 3/1990 | Mackenzie et al. | ......... | 209/166 |
| 2006/0032800 A1 * | 2/2006 | Correa-Castillo et al. | ... | 210/166 |

* cited by examiner

*Primary Examiner*—Thomas M. Lithgow
(74) *Attorney, Agent, or Firm*—Greenberg Traurig LLP; Charles Berman

(57) ABSTRACT

The present invention provides a ammoniated collector (amine, azepine, etc.) alone or in combination with other thiol-type collecting reactants, as well as sodium, iron, magnesium, and/or manganese sulfates, sulfurs, oxides, and hydroxides, acrylic acid polymers and copolymers or other spreading agents, in the process of grinding and floating mineral ores, in order to allow to set new floating operational conditions in existing mineral ore processing plants; to obtain substantial improvements in metallurgic productivity by improving the kinetics of the floating process, which allows to increase recovery of molybdenum, decrease recovery of iron, increase copper grade in copper concentrate, at least keep or improve copper recovery, among others, through the addition of a collecting reactant implying savings of up to 100% of consumption of modifying agents, such as lime, currently used.

4 Claims, 3 Drawing Sheets

Figure1 (Previous Art)

Figure 2 (Previous Art)

COLLECTING AGENT COMPRISING AMMONIATED COMPOUNDS (PRIMARY, SECONDARY, TERTIARY AMINES), FOR USE IN THE PROCESS OF GRINDING AND/OR FLOATING COPPER, MOLYBDENUM, ZINC, AND OTHER CONTAINED MINERAL ORES

FIELD OF APPLICATION

The present invention relates to mining processes, more specifically, to the formulation and application of a specific collecting reactant in grinding and float concentration processes for different mineral ores.

BACKGROUND OF THE INVENTION

Over the past 70 years, worldwide, in the float concentration processes that are carried out in concentrating plants for Copper, Molybdenum, Zinc and other metals, there has not existed much technological innovation in the use of collecting reactants, the most notable ones being that of combing existing collectors at different proportions, or by combining them with reactive foaming agents in order to handle the concept of a genetic reactant).

Currently, based on the size of the release of the mineral species of copper, molybdenum, zinc, and other contained metals, on the relationship of the same species and the electrochemical potential in the species' pulp as well as in the mineral species themselves, the hydrogen potential (pH) is adjusted at values optimum enough to produce the flotation of the mineral species with the assistance of the modifying reactants, the most used being, in decreasing order the following: hydrated lime, calcium hydroxide, calcium peroxide, soda, calcium carbonate, etc.

Based on the above, any technological innovation that may be found and may allow the flotation of copper, molybdenum, zinc mineral ores and other mineral ores contained, at pH's nearing the natural one, or that may decrease the consumption of Ph modifying reactants, kilograms of salt per ton of processed mineral, without the recovery thereof being diminished with respect to the existing collectors or that improve the kinetics of the flotation process thereof, will be of great benefit as to the processes' economic profitability parameters.

Thus, copper-molybdenum, zinc and contained metal concentrating plants operate under the following generic circuit:

Crunching: step of reducing the size of the mineral up to values below 12.7 mm (½").
Grinding: step whereby the mineral is finally crunched in the previous stages, and the pulp that is formed with the addition of water, pH modifying agents, collecting reactants and foaming agents is reduced to the final particle size that is necessary for the subsequent flotation by values close to 74 microns or −200 meshes;
Flotation: the operation through which the particles hydrofobized through the collector of copper-molybdenum, zinc and contained metals are separated from the iron ore and gangue, which are hydrophilized by the lime. Currently, pH is adjusted with additional quantities of lime, in order to obtain the maximum CU—Mo/Fe and/or Zn/Fe concentration ratio.

The tendency of most plants to regularly float a pH between 10.0 and 11.0, an interval where maximum collection of copper-molybdenum, zinc and contained metal, concentration is achieved, whereas maximum depression of the iron ore is obtained.

However, the consumption of lime or pH modifying agents is very high, becoming a significant percentage of production costs. The consumption of lime may range from 0.6 Kg/TDM (kilograms per Ton of Dried Mineral) to 2.0 Kg/TDM, to get a pH between 10.0 a 11.0.

PURPOSES OF THE INVENTION

The main purpose of the present invention is to provide a ammonia ammoniated collecting reactant only based on azepine and/or derivatives and/or modifications and/or combinations with other thiol-type collectors, as well as their combinations with sodium, iron, magnesium, and/or manganese sulfates, sulfurs, oxides, and hydroxides, acrylic acid polymers and copolymers or other spreading agents.

Another purpose of the present invention, with the development and application of this kind of collecting reactant, is to provide and allow to set new operational conditions for flotation in existing mineral processing plants that are currently established as standards as to the operational pH of flotation plants.

Another purpose of the present invention is to obtain substantial improvements in metallurgical productivity by improving the kinetics of the floating process, which allows increase the recovery of Molybdenum, decrease recovery of Iron, increase copper grade in copper concentrate and, at least, keep or improve copper ore recovery, among others.

Another purpose of this invention is to obtain substantial economic improvements in the mineral ore concentration processes when permitting to float Copper, Molybdenum, Zinc and other contained minerals at a lower pH ranging from 7 to 8, bringing up savings of up to 100% of the consumption of pH modifying agents, for example, lime.

DESCRIPTION OF THE INVENTION

The present inventions provides a ammoniated collector based on amine, azepine alone and/or its derivatives, and/or its modifications, and/or combinations thereof, within a 4 g/TDM to 30 g/RDM (grams per Ton of Dried Mineral)) interval, alone or in combination with other thiol-type collecting reactants, such as with sodium, iron, magnesium, and/or manganese sulfates, sulfurs, oxides, and hydroxides, acrylic acid polymers and copolymers or other spreading agents in the grinding and/or flotation.

The design of rougher laboratory flotation tests as conducted to date with the use of ammoniated collectors, (amine, azepine, etc.) with mineral ores from different Chilean and Mexican plants, has allowed to find promising results with direct benefits, such as: the substantial decrease of lime necessary to obtain the maximum Cu—Mo/Fe, Zn/Fe enriching ratio, that is, savings in the consumption of lime versus standard collectors of up to 100%; Increase in the Cu concentration ration of up to 30% due to the non-flotation of the Fe mineral ores; Increase of up to 6 points (equivalent to a rise of 50%) in copper grade in the primary concentrate; A 1% to 4% increase in the recovery of Molybdenum in the primary concentrate.

There are further benefits, such as: Improved final Cu and Mo concentrate grade; Decrease in retention time during the primary concentrate washing stages due merely to the increase in the concentration ratio; Increase in the copper concentrate thickening capacity available; Increase in the availability of filtering equipment; Decrease in pipe clogging due to the decrease of calcium carbonate precipitation.

All of the above is accomplished with a type of ammoniated collecting reactant based on (1H-Azepine Hexahydre, alone or its derivatives, or modifications, or the combination of any of the aforementioned resulting products at rations of up to 50% with glycols, or tripropilenglycol, or polypropilenglycol, or other alcohols or water-compatible or soluble complementary compounds.

In order to implement the present invention at each concentrating plant, the mineral species present must be analyzed to determine the natural pH condition of the mineral ore to be processed, analyze the reactants each plant uses in order to determine the ideal quantity of the collecting reactant of the present invention, by way of the necessary laboratory metallurgic tests.

DETAILED DESCRIPTION OF THE INVENTION

Figure 1:
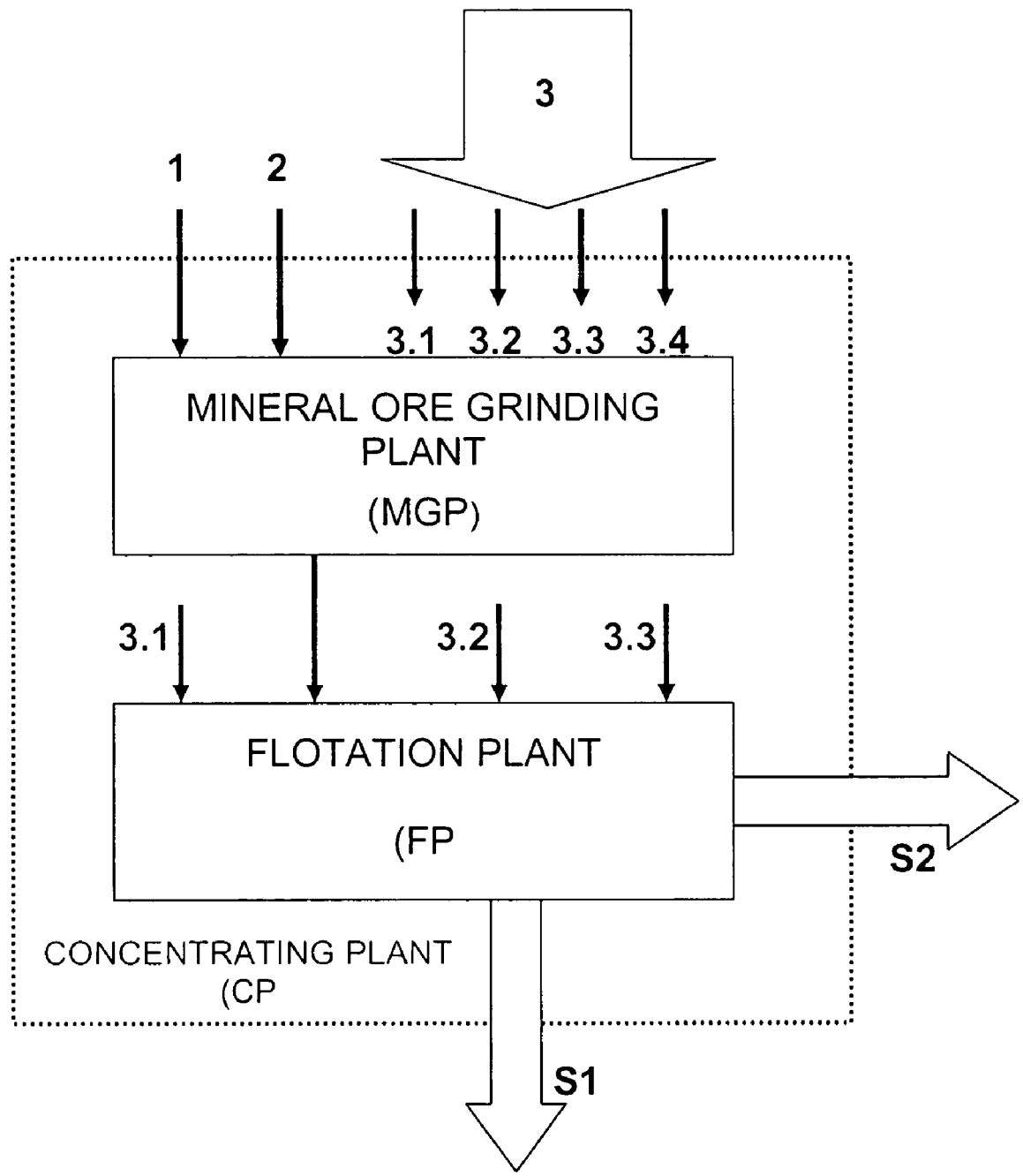
FIG. 1 (previous art) is a general schematics showing the stages in a typical concentration plant where the present invention is applied.

For explanatory purposes, FIG. 1 is a very general schematics showing the stages in a typical concentrating plant (CP), wherein this invention is applied. At the grinding plant mineral ore feeding (MGP) and/or flotation plant (FP), the collecting reactant is shown as a part of the fraction that is generically referred to as collectors (3.2).

Specifically, the collecting reactant (3.20) of the present invention, substitutes the standard collecting reactant (s) (3.2) used by each plant, with metallurgic and/or economic advantages for the entire mineral ore concentration process, mainly regarding lime savings ((3.1) since it allows that the flotation process to decrease the operational pH drastically from 10.0 11.0 to 7.0-8.0 ranges. This drastic pH reduction at the flotation plant may bring about a drop in the global consumption of lime (3.1) between 50% and 90%. It must be noted, at this point, that lime is the chemical each plant uses for conditioning pH in the pulp, at which the recovery of the mineral species gets more efficient depending on each plant's operational parameters, it is the ammoniated collector (3.20) which must be determined to provide a stable product, for which purpose there are, at least, alternatives based on azepine alone, and/or its derivatives, and/or its combinations with other thiol-type collectors, as well its combinations with sodium, iron, magnesium, and/or manganese sulfates, sulfurs, oxides, and hydroxides, acrylic acid polymers and copolymers or other spreading agents.

Examples of the Application

Figure 2:
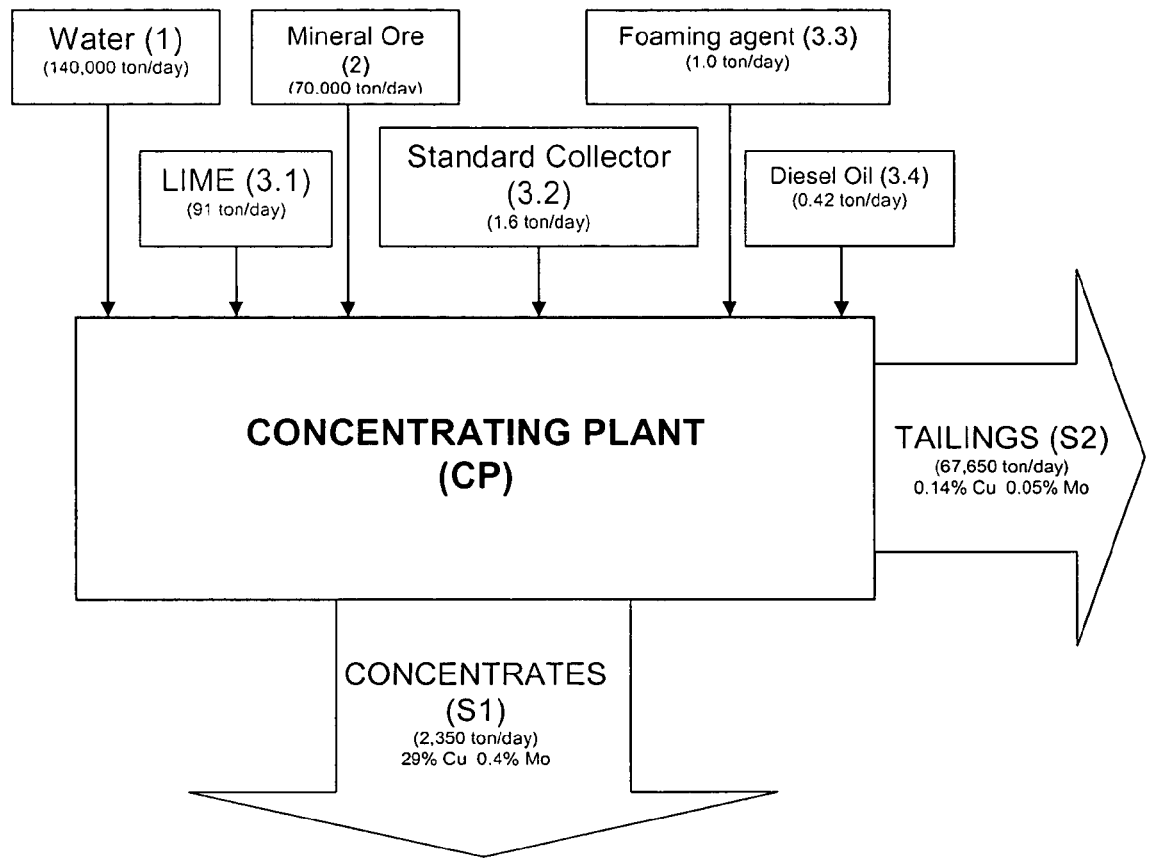
FIG. 2 (previous art), is a general schematics showing a processing plant that processes 70,000 ton/day of copper and molybdenum mineral ore, and to which the present invention is applied.

As an example, in general, we may represent, schematically, a typical concentrating plant (CP) that processes 70,000 ton/day of copper and molybdenum mineral ore (2), as can be seen in FIG. 2. Indicated in the plant's input figures are the mineral treatment parameters and their respective consumption of water (1) of approximately 140,000 ton/day, and reactants that are reasonably considered for purposes of this example. Thus, the consumption of lime (3.1) of approximately 91 ton/day, of collectors (3.2) of approximately 1.6 ton/day, of foaming agents (3.3) of about 1.0 ton/day, and diesel oil (3.4), around 0.42 ton/day.

The output of the concentrating plant (PC), correspond to the exit production of Cu/Mo concentrate (S1), with approximately 2,350 ton/day, with 29% copper, corresponding to 87% copper recovery, and 0.4% of molybdenum, corresponding to 70% of molybdenum recovery; tailing outputs (S2) with approximately 67,650 ton/day, that is 0.14% copper, and 0.05% molybdenum. These figures represent the metallurgic production of the plant used as an example.

Main Parameters of the Plant Used as an Example:

Mining Plant, of the greater mining industry, used to process Copper and Molybdenum.

Tonnage: 70,000 ton/day

CU head grade: 1.10% Cu

Mo head grade: 0.020% Mo

Copper recovery: 87.5%

Molybdenum recovery: 70.0%

CU concentrate grade: 29.4% Cu

Mo concentrate grade: 0.40% Mo

The present invention is justified for its technical and economic aspects, in that it keeps the metallurgic characteristics of the metal concentrate produced, the variations in the supplies corresponding to the reactants used at the concentrating plant's input favor its application, mainly for the resulting substantial savings of lime due tot the drastic decrease in the pH that the collecting reactant makes that is carried out at the flotation plant. The savings of lime that is expected to take place in applying the collecting reactant of the present invention in the plant used as an example, falls in a range between 50% and 90% of savings of lime, that is, a decrease in the pH from 10.0-11.0 to 7.0-8.0.

Figure 3:
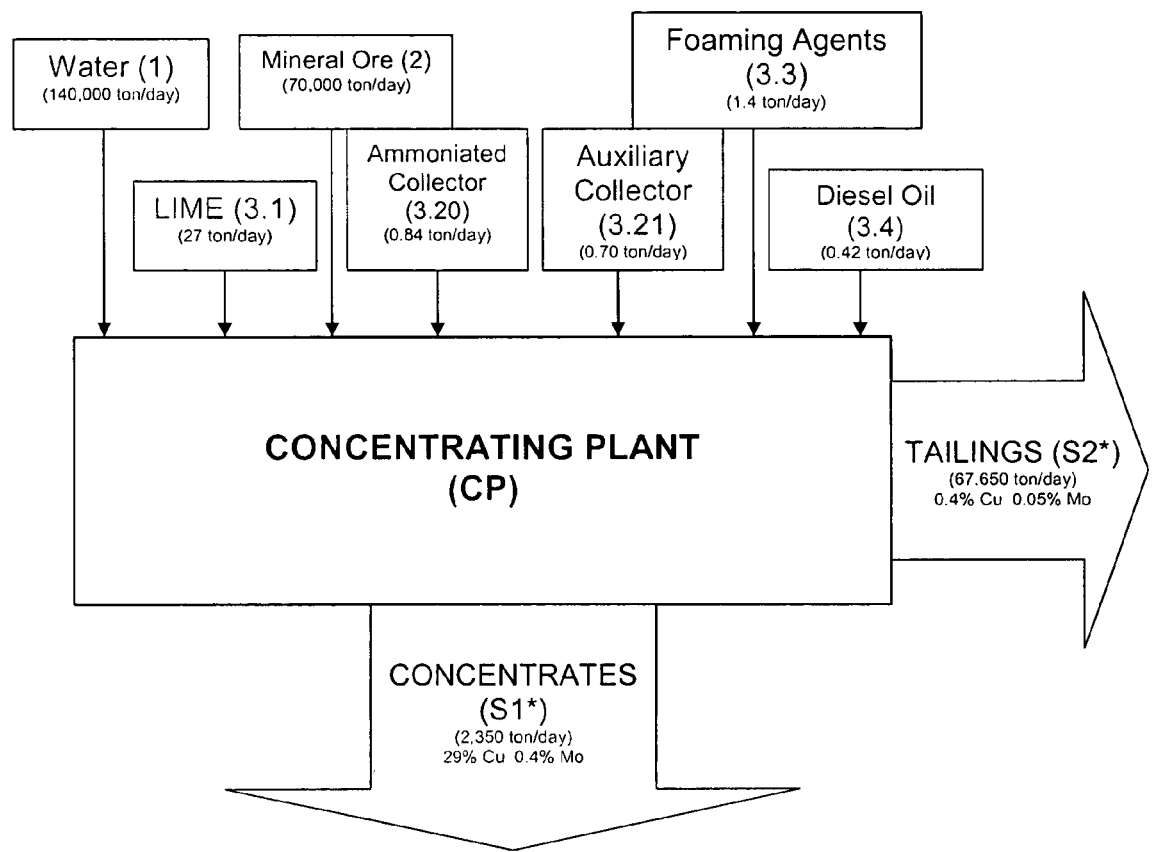
FIG. 3 is a general schematics showing a processing pant that processes 70,000 ton/day of copper ad molybdenum mineral ore, same as FIG. 2, but using the collecting reactant of the invention.

The significant global reduction of the costs associated with the consumption and price ranges involved in the process is directly related to each product that is used in the process, is directly related to the consumption and price ranges fore the respective raw materials. The total number of collectors used in the model plant amounts to 1.6 ton/day. And the total amount of lime used in the process is 91 ton/day, approximately. With the present invention, the consumption of lime is decreased, keeping the output parameters ((S1, S2), that is:

$S1 \leq S1^*$ and $S2 \leq S2^*$ (see FIGS. 2 and 3).

In the case of the plant of the example, the table below shows the results in the cost of the process versus the consumption of standard reactants and the reactants of the present invention.

TABLE 1

Referential costs vs. Consumption of reactant, estimated at plant in the example, according to FIGS. 2 and 3.

| | Process with Standard reactants) (FIG. 2) | | |
|---|---|---|---|
| | Consumption | | referential Cost |
| Product | g/ton | ton/day | US$/day |
| CAL (3.1) | 1.300 | 91.0 | 10,920 |
| Foaming Agent (33) | 15 | 1.0 | 6,010 |
| Diesel oil (3.4) | 6 | 0.42 | |
| Collector (3.2) | 22 | 1.6 | |
| TOTAL | | | 16,930 |

TABLE 1-continued

Referential costs vs. Consumption of reactant, estimated at plant in the example, according to FIGS. 2 and 3.

Process with ammoniated collecting reactant based on amine, azepine alone, and/or its derivatives, and/or its modifications, and its combinations
(FIG. 3)

| Product | Consumption | | Referential Cost6 |
|---|---|---|---|
| | g/ton | ton/day | US$/day |
| CAL (3.1) | 390 | 27.3 | 3,276 |
| Faming Agent (3.3) | 20 | 1.4 | 6,174 |
| Diesel oil (3.4) | 6 | 0.42 | |
| Collector (3.20) | 12 | 0.84 | |
| Auxiliary Collector (3.21) | 10 | 0.70 | |
| TOTAL | | | 9,450 | g/ton: grams of the product by ton of mineral ore treated
ton/day: tons of the product per day.
Auxiliary Collector: Xanthate

What is claimed is:

1. A collecting agent for use in grinding and/or float processes for copper, molybdenum, zinc and other ores contained in said processes, the collecting agent comprising ammoniated compounds and polypropyleneglycol;

the collecting agent further comprising primary amines, secondary amines, and tertiary amines; and the collecting agent further comprising azepines.

2. The collecting agent for use in grinding and/or float processes of claim 1, wherein said polypropyleneglycol is tripropylene glycol.

3. The collecting agent for use in grinding and/or float processes of all the aforementioned claims, wherein said collecting agent is comprised of about 50% azepine, and about 50% polypropyleneglycol.

4. The collecting agent for use in grinding and/or float processes of claim 1, wherein said collecting agent is comprised of about 50% azepine, and about 50% water.

* * * * *